2 Sheets—Sheet 1.
S. BIDWELL.
Locomotive Lamp Case.
No. 13,537. Patented Sept. 4, 1855.
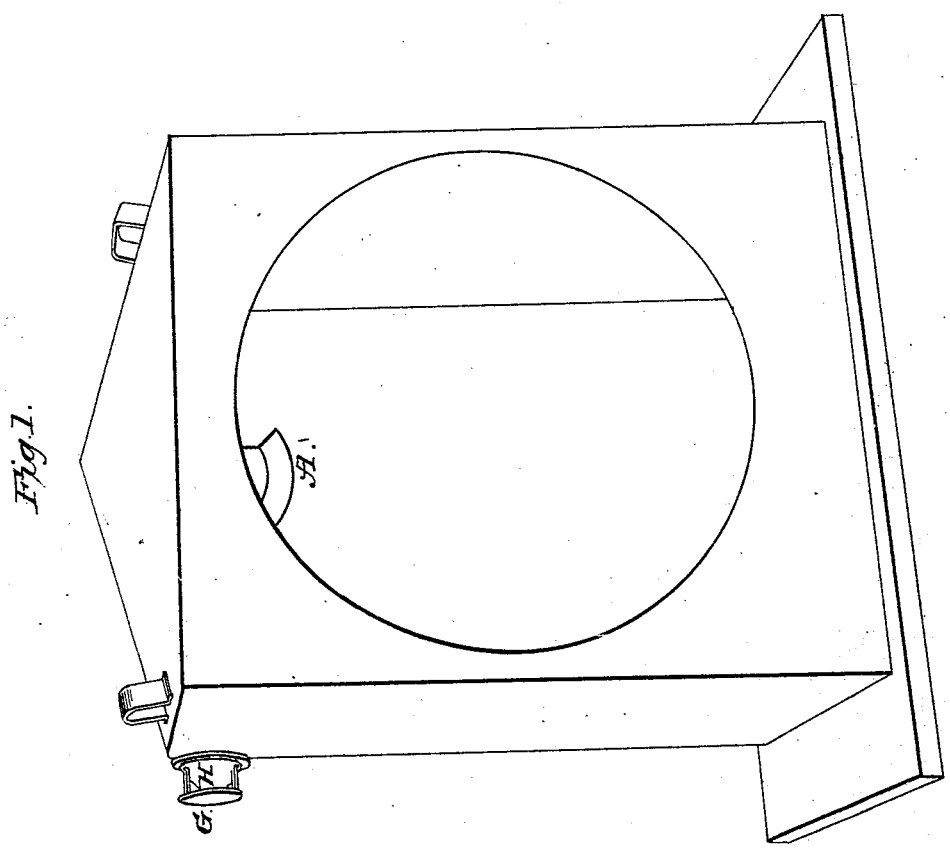

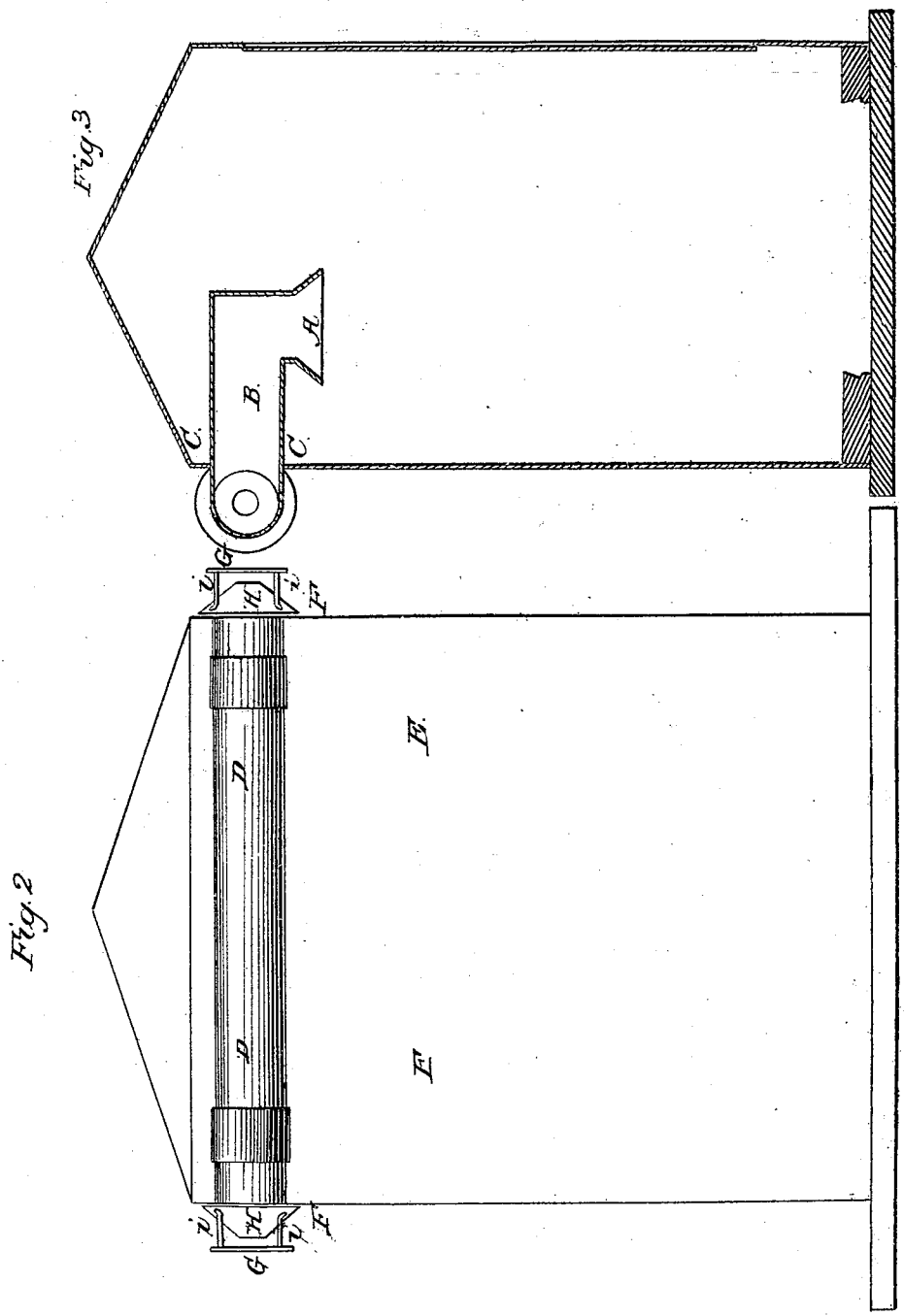

UNITED STATES PATENT OFFICE.

SALMON BIDWELL, OF ROCHESTER, NEW YORK.

LOCOMOTIVE LAMP-CASE.

Specification of Letters Patent No. 13,537, dated September 4, 1855.

*To all whom it may concern:*

Be it known that I, SALMON BIDWELL, of the city of Rochester, in the county of Monroe and State of New York, have invented a new and useful Improvement in Lamp-Cases for Locomotive-Engines; and I do hereby declare that the following is a full and exact description of the said invention and of the construction and operation of the same, reference being had to the annexed drawing, making a part of this specification, in which the several parts are represented as follows:

Figure 1 is a front elevation of the lamp case. Fig. 2 is a back elevation of the lamp case. Fig. 3 is an end elevation of the lamp case.

The nature of my invention consists in arranging that portion of the chimney above the burner of the lamp so as that the external orifice of the chimney may be back of a direct line drawn across the burner to either side of the lamp case, on one or either side, or entirely back of the lamp case on either side of a line drawn from the burner of the lamp; directly backward therefrom. This is for the purpose of bringing the external orifice of the chimney within the current of air on either side of the smoke stack while the engine is in motion. Currents of air are thrown downward, and on either side of the smoke stack owing to its peculiar slope, and also within the side currents of air passing by the lamp case on either side. These currents of air are used for the purpose of creating and keeping up a strong and uniform draft to the chimney of the burner by means of a conical shaped capped chimney, by means of which these currents of air produce suction, giving brilliancy and permanence to the flame of the lamp.

In the drawing in Figs. 1 and 3 A, represents the inner orifice into which the glass chimney of the lamp passes. In Fig. 3 B, represents the chimney extending backward from the lamp by means of an elbow either at right angles with or diagonally from the orifice A, toward or without the back of the lamp case, C, C, and passing into the chimney or pipe D, D, in Fig. 2, which extends horizontally across the back of the lamp case E, E, to either side of the case.

The tops or ends of the chimneys or pipes in Fig. 1, G, and Fig. 2, G, G, are covered with the truncated cones H, H, over which there extends the flat plate G, G, supported by the standards *i, i*.

The positions of the ends of the exterior chimneys or pipe G, G, is not confined to the back part of the lamp case as seen in Fig. 2, but may occupy any place back of a straight line drawn through the flame of the lamp to either side of the case, so that the external orifice of the chimney be brought into one or both of the currents of air formed on either side of the smoke stack and lamp case in the manner above described, so as to prevent the eddy formed immediately in front of the smoke stack from extinguishing the lamp by checking the draft, and there may be one or more escape orifices for the smoke from the lamp.

What I claim as my invention and desire to secure by Letters Patent is the following—that is to say:

The placing of the chimney horizontally and in such a position as to discharge the smoke near the top and behind the lamp case as herein described and shown.

In testimony whereof I have hereunto signed my name before two subscribing witnesses.

SALMON BIDWELL.

Witnesses:
D. CAMERON HYDE,
JOHN W. DENNY.